UNITED STATES PATENT OFFICE.

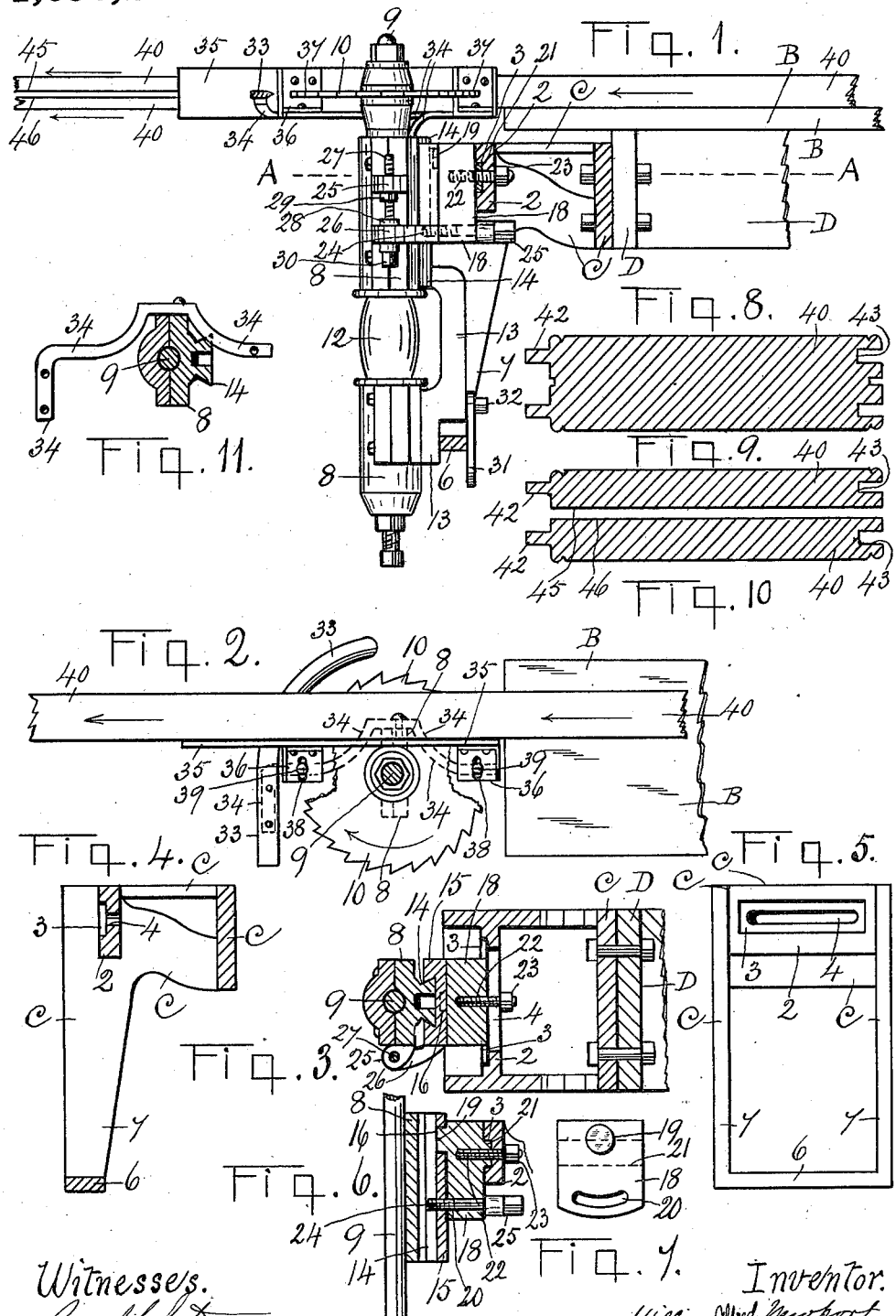

WILLIAM ALFRED NEWPORT, OF HAMILTON, ONTARIO, CANADA, ASSIGNOR OF ONE-HALF TO GEORGE J. WHITE, OF HAMILTON, ONTARIO, CANADA.

WOODWORKING MACHINERY.

1,093,198.  Specification of Letters Patent.  Patented Apr. 14, 1914.

Application filed December 20, 1913. Serial No. 807,950.

*To all whom it may concern:*

Be it known that I, WILLIAM ALFRED NEWPORT, a subject of the King of Great Britain, and resident of Hamilton, in the county of Wentworth and Province of Ontario, Canada, have invented new and useful Improvements in Woodworking Machinery, of which the following is a specification.

My invention relates to improvements in wood working machinery, and consists of a horizontal circular saw on a vertical rotary shaft in bearings indirectly attached or connected to a rear part of a wood matching and molding machine, commonly called a sticker machine.

The objects of my invention are first, to re-saw between double tongue and double grooved lengths of matched boards; second, to provide means for vertically raising and lowering the saw in relative position to the rigid horizontal table of the machine, in order to re-saw heavy and light pieces; third, to provide means for laterally adjusting the saw, fourth, to provide means for tilting the saw to various angles relative to the table, and fifth, to provide means in the rear of the saw to keep the re-sawn pieces apart, one from the other, thereby imparting freedom to the saw, and equalizing the parallel size or thickness of each piece re-sawn. I attain these objects by the mechanism illustrated in the accompanying drawing, in which:—

Figure 1 is a partial sectional elevation of my improved mechanism and supporting frame attached to the rear end part of a common sticker and molding machine, showing the rear end part of the machine, the downwardly extending leg of the frame being broken away in order not to obstruct the view of portions of the mechanism attached thereto. Fig. 2 is a plan of the same, parts of the horizontal saw being broken away, to show the mechanism, partially in broken lines, for supporting the segmental saw guard, together with the board-gage. Fig. 3 is a sectional plan of the attachments through the broken horizontal line A, A, of Fig. 1, of the drawing. Fig. 4 is a detail sectional elevation of the detached steadying and supporting frame. Fig. 5 is a rear view, or elevation, of the supporting frame. Fig. 6 is a sectional elevation of a portion of the rear mechanism of Fig. 3, of the drawing. Fig. 7 is a rear face elevation of the intermediate block showing the upper round pivoted hub and the lower segmental slot, concentric with said hub. Fig. 8 is an enlarged section of a board which has been machined by the common sticker and molding machine previous to the re-sawing thereof. Fig. 9 is a section of the upper part of the same board after re-sawing, and Fig. 10 is a section of the lower part of the same board after re-sawing. Fig. 11 is a sectional plan of the upper bearing of the saw-shaft showing mechanism secured to said bearing to support the saw guard and gage.

Similar characters of reference refer to similar parts throughout the several views.

In the drawing B is a horizontal table of a common molding and sticking machine, and C is a frame rigidly bolted to a rear part D of the machine, and below said table. The frame C, has a rear transverse flange 2, having a transverse recess 3 thereto, and a transverse slot 4 therethrough.

6, is a transverse bar connecting the downwardly extending legs 7 of the frame and is integral therewith.

8, are ordinary bearings which support a vertical shaft 9, to which the horizontal saw 10 is secured in the usual manner of shafts and saws, and 12 is a belt driven pulley on said shaft and between said bearings. The bearings are rigidly connected together by means of a vertical brace 13, and at the connection of said brace with the upper said bearing, the sides of the bearing, are beveled, or V shaped, as at 14, for sliding purposes.

15, is an intermediate vertical guide plate, the rear face of which has vertical flanges which are beveled to conform to the V bevels or dovetails of the bearing, to allow and to guide said bearing to vertical adjustment in opposite directions. The opposite side of the plate 15, has a round recess, or hole 16, in the upper and middle part thereof. The intermediate block 18, has a round hub 19, on its rear face and on the upper and middle part thereof, adapted to fit snugly and easily in the round recess 16 of the plate 15. The block 18, has a segmental slot 20, through the lower part thereof, said slot being concentric with the hub 19.

21, is a transverse guide on the front face of the block 18, adapted to slide in the transverse recess 3, in the rear face of the rigid frame C, previously referred to.

The bolt 22, is rigidly secured in the block 18, and the nut 23, on said bolt, and secures the frame C, and the block 18, to a transverse adjusted position thereby allowing the block together with the saw and its bearings to be transversely adjusted.

24, is a bolt, and 25 is the head which extends a distance forwardly to facilitate the application of a wrench to the head, said bolt 24 extends freely through the slot 20, and screws into the guide plate 15, thereby securing the block to the plate. The slot 20 allows the plate 15, together with the vertical saw bearings 8, to be set at a side angle from the vertical, thereby allowing the saw to be placed at a side angle in order that the same may saw bevel work.

The plate 15, together with the bearings 8, are adapted to swivel by means of the round hub 19, on the block 18, fitting into the round recess 16 in the plate 15, and rigidly secured to said plate by the bolt 24.

The upper bearing 8, has an upper lug 25, and the plate 15, has a lower lug 26, in vertical alinement with the upper lug.

27, is a screwed vertical rod extending through the central parts of the lugs and is provided with a suitable collar 28, on the lower lug, a nut 29 on the underside of the upper lug, and a lower head 30, which when rotated, the bearings 8, together with the saw, may be adjusted to a higher, or to a lower position relative to the table of the machine.

31 is a lever having swivel connection at 32, to the lower part of the bearing brace 13, and is for the purpose of engaging the front side of the transverse lower bar, or part 6, of the frame C, to lock the lower bearing 8, to the frame C, thereby steadying the lower bearing 8, when the bearings are adjusted to a higher or to a lower position. It will be noticed that there is sufficient depth of surface on the lower front part of the brace 13, to allow of the vertical adjustment of the bearings 8, the frame C, being permanent and rigid.

The segmental guard 33, in the rear of the saw 10, holds the re-sawn boards apart to give freedom to the saw, and the guard is held in horizontal line with the saw, by means of a suitable bracket arm 34, secured to the underside of the guard, and at a convenient place to the upper part of the upper bearing 8. The bracket arm also extends in an opposite, or forward direction thereby forming two arms 34, which support the horizontal guide plate 35, by means of angle plates 36, which have slots 38, and the screws 39 of the arms 34, are in said slots and allow the plates 36, together with the horizontal guide 35, to be adjusted and secured to suit different widths of boards and to gage the boards being sawn. One said board 40 being on the table partially re-sawn, as shown in Fig. 1, of the drawing.

I am aware that saw gages, on saw tables are not new.

The horizontal saw gage together with the vertical flanges of the angle plates 36, have horizontal slots 37, to allow the saw to rotate therein and to allow adjustment of the gage.

The tongues 42 and the grooves 43, in the boards 40, shown in Figs. 8, 9 and 10 of the drawing, and the moldings in said boards are not shown in the board 40, on the table of the machine, in order not to confuse the lines of said tongues and grooves, with the lines 45, and 46 of re-sawing or severance of the board 40. The direction of the travel of the board 40, on the machine, and the rotary travel of the saw, are indicated by arrows, in each case.

What I claim as my invention and desire to secure by Letters Patent, is:—

1. A wood working machine, a frame rigidly secured to the rear end part of the machine, bearings one above the other connected to the frame, a vertical shaft in the bearings and extending therethrough, a drive pulley on the shaft between the bearings, a brace rigidly connecting the bearings, a saw on the upper part of the shaft and above the table of the machine, and means connected to the lower part of the brace adapted to engage with the lower part of the frame to lock the lower bearing thereto.

2. A wood working machine, a frame secured to the rear end part of the machine, bearings one above the other, a vertical plate having beveled side flanges secured to the frame, a vertical shaft in the bearings, a drive pulley on the shaft between the bearings, a saw on the upper part of the shaft, a brace rigidly connecting the bearings together, slide means on the upper bearing adapted to slide between the said side flanges, lugs on the upper bearing and on the plate, means through said lugs adapted to raise and lower the bearings together with the saw, and means on a lower part of the brace to engage with the lower part of the frame, to lock the lower bearing thereto.

3. A wood working machine, a frame rigidly secured to the rear end part thereof having a transverse recess and a transverse slot therethrough, a block provided with a transverse guide fitting in said recess and adapted to slide therein, and rigidly secured to the frame, bearings in vertical alinement, a brace rigidly connecting said bearings, said block connected to the upper bearing and means on a lower part of the brace to lock the lower bearing to the frame.

4. A wood working machine, a frame secured to the rear end part thereof, a block provided with a hub on the upper part of the rear face thereof, and having a lower slot therethrough concentric with the hub, and secured to the frame, a plate having a round hole to receive said hub, a bolt extending through the slot and screwed into said plate, beveled side flanges on the rear or opposite side of the plate, vertical bearings one above the other, and a distance apart, the upper said bearing adjustably secured to said plate, a brace rigidly connecting the bearings, and means on a lower part of the brace to lock the lower bearing to the frame.

5. A wood working machine, a frame secured to the rear end part thereof, bearings one above the other, a brace rigidly connecting the bearings, means on the lower end part of the brace adapted to lock the frame to the lower bearing, a saw guard in the rear of the saw and in horizontal alinement therewith, bracket arms secured to the upper bearing and to the guard to support said guard, a horizontal guide plate to guide the board being re-sawed, and means secured to the guide plate, and adjustably secured to the arms.

6. A wood working machine, a frame bolted to the rear end part thereof, and having a transverse recess and a transverse hole through said recessed part, a block provided with a raised guide to fit said recess and adapted to slide therein, and secured to the frame, a hub on the rear and opposite side of the block, said block having a lower oblong opening therethrough concentric with the hub, a vertical plate having an upper round opening to receive said hub, a bolt through said oblong opening and screwed into said plate, beveled flanges on the rear and opposite face of the plate, bearings in vertical alinement one above the other, lugs on the plate and on the upper said bearing, means through said lugs to allow vertical adjustment of the bearings, a brace rigidly connecting said bearings, and means connected to the brace adapted to lock said bearing and frame together.

WILLIAM ALFRED NEWPORT.

Witnesses:
 GEORGE WHITE,
 JOHN H. HENDRY.

Copies of this patent may be obtained for five cents each, by addressing the "Commissioner of Patents, Washington, D. C."